US008662393B2

(12) United States Patent
Chihara

(10) Patent No.: US 8,662,393 B2
(45) Date of Patent: Mar. 4, 2014

(54) RECEIPT AND CLAIM TICKET PRINTING DEVICE, AND RECEIPT AND CLAIM TICKET PRINTING SYSTEM

(75) Inventor: Kazunori Chihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 13/354,646

(22) Filed: Jan. 20, 2012

(65) Prior Publication Data
US 2012/0187183 A1    Jul. 26, 2012

(30) Foreign Application Priority Data

Jan. 20, 2011    (JP) .................................. 2011-009484

(51) Int. Cl.
G06F 17/00    (2006.01)
G06F 19/00    (2011.01)
G06Q 30/00    (2012.01)

(52) U.S. Cl.
USPC ...... 235/385; 235/375; 705/14.26; 705/14.65

(58) Field of Classification Search
USPC ..................... 235/375, 385; 705/14.26, 14.65
See application file for complete search history.

(56) References Cited

U.S. PATENT DOCUMENTS

2006/0108419 A1*  5/2006  Som ............................... 235/383
2011/0270695 A1* 11/2011  Jones et al. ..................... 705/18
2011/0295713 A1* 12/2011  Ehrenberg et al. .......... 705/26.41

FOREIGN PATENT DOCUMENTS

| JP | 09-259355    A | 10/1997 |
| JP | 2005-165550  A |  6/2005 |
| JP | 2006-172309  A |  6/2006 |
| JP | 2006-293415    | 10/2006 |

* cited by examiner

Primary Examiner — Michael G Lee
Assistant Examiner — Laura Gudorf
(74) Attorney, Agent, or Firm — Nutter McClennen & Fish LLP; John J. Penny, Jr.; Christina M. Sperry

(57) ABSTRACT

Accidents such as mistakenly delivering products belonging to a different buyer to the wrong person can be prevented. A receipt and claim ticket printing device that issues to a buyer of a product a receipt showing the product name and price and the total purchase amount, and a claim ticket for the product purchased by the buyer, has a product image storage unit that stores product images of the products that are sold; a product image extraction unit that extracts the product image of at least one of the purchased products from the product image storage unit when the receipt is issued; and a print unit that prints the claim ticket on which the extracted product image is printed with the receipt.

18 Claims, 5 Drawing Sheets

```
      O× DUTY-FREE SHOP
         ZZZ AIRPORT
           RECEIPT                    ─1000

RECEIPT:     YYYY-MM-DD
                     HH:MM

CHOCOLATE          $ 15
   COOKIES            $ 24
   WINE               $ 20
   BRANDY             $ 95

TOTAL              $ 154
```

FIG. 3

```
      O× DUTY-FREE SHOP
         ZZZ AIRPORT

CLAIM TICKET              ─1010-A
         (STORE COPY)

CHOCOLATE          1 BOX
   COOKIES            2 BOXES
   WINE               1 BOTTLE
   BRANDY             1 BOTTLE
```

FIG. 4

RECEIPT AND CLAIM TICKET PRINTING DEVICE, AND RECEIPT AND CLAIM TICKET PRINTING SYSTEM

Priority is claimed under 35 U.S.C. §119 to Japanese Application No. 2011-009484 filed on Jan. 20, 2011, which is hereby incorporated by reference in its entirety.

BACKGROUND

1. Technical Field

The present invention relates to a receipt and claim ticket printing device and to a receipt and claim ticket printing system. More specifically, the invention relates to a receipt and claim ticket printing device and a receipt and a claim ticket printing system capable of printing both a receipt showing the total purchase amount and the name and price of each product purchased, and a claim ticket for the purchased products, to the buyer of the products.

2. Related Art

Receipt printers capable of printing receipts with images of purchased products when products are purchased in a retail store are known from the literature. See, for example, Japanese Unexamined Patent Appl. Pub. JP-A-2005-165550. Receipt printers capable of extracting products related to the purchased products and printing images of those products on receipts are also known from the literature. See, for example, Japanese Unexamined Patent Appl. Pub. JP-A-2006-172309.

For buyer convenience and considerations related to the handling of duty-free goods, however, duty-free products purchased at duty-free shops in some airports are delivered to the buyer at the gate before boarding the plane instead of at the time of purchase. If the duty-free goods that are purchased are sealed in an opaque bag that prevents seeing the contents, however, delivery of the duty-free goods to the buyer may depend upon the person responsible for the duty-free goods remembering which bag holds the products matching the product names printed on the receipt presented by the buyer.

This requires additional time to check the names and quantities of the products, and can easily result in such problems as extremely common products being mistakenly handed to the wrong customer. This can also happen in normal retail stores and department stores where customers can temporarily check purchased products and can pick up all of the purchased products together after finished shopping.

SUMMARY

One aspect of the invention is a receipt and claim ticket printing device that issues to a buyer of a product a receipt showing at least the product name and price and the total purchase amount, and a claim ticket for the product purchased by the buyer, and includes: a product image storage unit that stores product images of the products that are sold; a product image extraction unit that extracts the product image of at least one of the purchased products from the product image storage unit when the receipt is issued; and a print unit that prints the claim ticket on which the extracted product image is printed with the receipt.

By printing a claim ticket with an image of a purchased product together with the sales receipt at the time the product is purchased, this aspect of the invention enables confirming that the correct goods are delivered even when the purchased goods are delivered to the buyer after being temporarily held for the buyer by looking at the product image printed on the claim ticket. Accidents such as delivering products belonging to a different customer to the wrong person can therefore be prevented.

In a receipt and claim ticket printing device according to another aspect of the invention, the product image extraction unit preferably extracts a product image with high distinguishability amongst the purchased products when plural products are purchased. Further preferably, the product image storage unit stores product images of the products that are sold linked to the price and quantity sold of the products; and the product image extraction unit selects from among the product images of the plural purchased products at least one of the product with the highest price and the product with the smallest quantity sold, and extracts the product image of that product.

By printing a product image of a product that is less likely to be included in the products purchased by other buyers on the claim ticket, verification using the claim ticket is even more reliable and easier when delivering the purchased goods to the buyer.

In a receipt and claim ticket printing device according to another aspect of the invention, the product image extraction unit extracts the product image of the product selected by the buyer from among the plural purchased products.

This aspect of the invention enables finding the purchased products more easily when delivering the purchased products to the buyer because the buyer can look for the purchased product while referring to a claim ticket printed with an image of the product selected by the buyer.

Further preferably in a receipt and claim ticket printing device according to another aspect of the invention, the print unit prints a buyer claim ticket for the buyer and a store claim ticket for the store that temporarily holds the purchased products.

This aspect of the invention enables more reliably preventing picking errors when delivering the products by comparing the claim ticket held by the buyer with the claim ticket kept by the store clerk that is holding the products. In addition, if the buyer loses the claim ticket, the store clerk can easily find the products purchased by the buyer by using the sales receipt given to the customer to find the matching claim ticket kept by the store.

Further preferably in a receipt and claim ticket printing device according to another aspect of the invention, the print unit prints the store claim ticket on a label that can be affixed to a surface of packaging for the purchased product.

By affixing the claim ticket to the surface of the product packaging when holding goods for the buyer, the product can be more easily found when the buyer returns and claims the purchased product.

Further preferably in a receipt and claim ticket printing device according to another aspect of the invention, the print unit prints the buyer claim ticket in unison with the receipt.

By thus printing the claim ticket together with the receipt, the buyer is less likely to lose the claim ticket.

Another aspect of the invention is a receipt and claim ticket printing system that issues to a buyer of a product a receipt showing at least the product name and price and the total purchase amount, and a claim ticket for the product purchased by the buyer, including: a computer that has a product image storage unit that stores product images of the products that are sold, and a product image extraction unit that extracts the product image of at least one of the purchased products from the product image storage unit when the receipt is issued; and a receipt and claim ticket printing device that is connected to the computer over a communication line, and has a print unit that prints the claim ticket on which the extracted product image is printed with the receipt.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows an example of a sales receipt 1000.

FIG. 4 shows an example of a claim ticket 1010-A for the store.

DESCRIPTION OF EMBODIMENTS

A preferred embodiment of the present invention is described below with reference to the accompanying figures. The embodiment described below does not limit the scope of the invention described in the accompanying claims, and a combination of all of the features of the following embodiment are not required for the solution provided by the invention.

Figure 1:
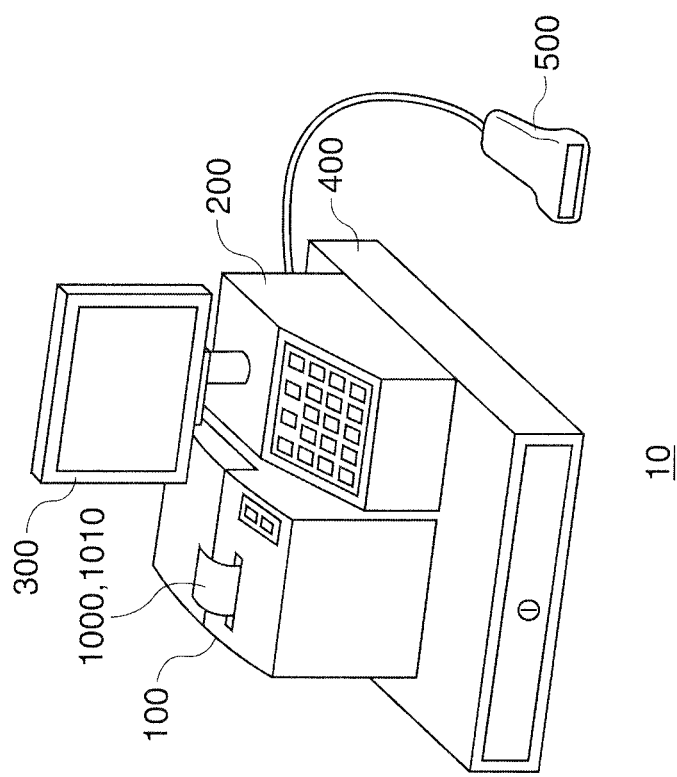
FIG. 1 is an oblique view of a receipt and claim ticket printing system 10 according to a preferred embodiment of the invention.

FIG. 1 is an oblique view of a receipt and claim ticket printing system 10 according to a preferred embodiment of the invention. The receipt and claim ticket printing system 10 according to this embodiment of the invention is a system capable of printing a sales receipt 1000 showing the name and price of each purchased product and the total amount of the purchased goods for the buyer of the goods, and a claim ticket 1010 when the buyer wishes to check the products temporarily for pickup at a later time. The receipt and claim ticket printing system 10 includes a receipt and claim ticket printing device 100, an operating terminal 200, a display device 300, a cash drawer 400, and a barcode scanner 500.

Figure 2:
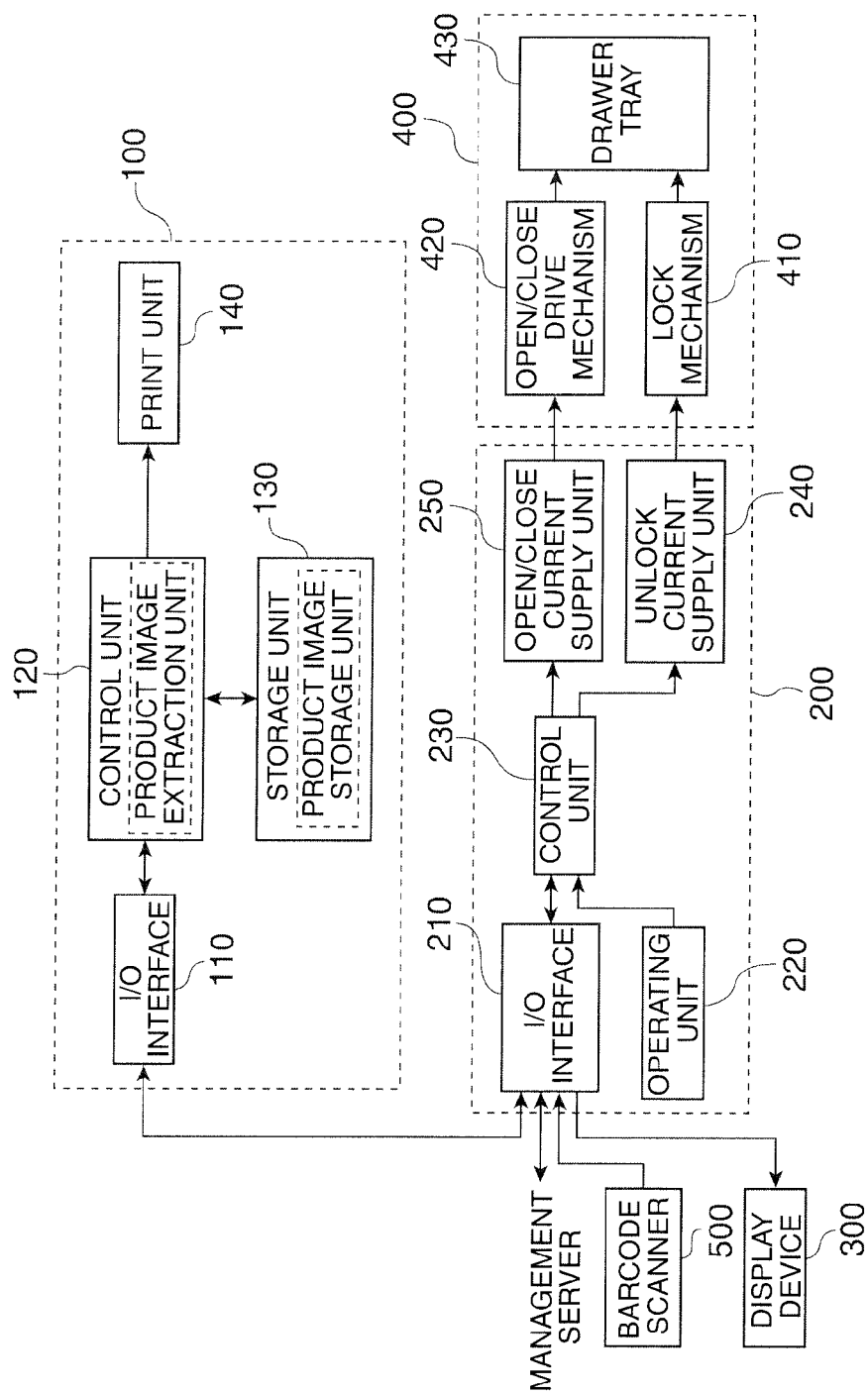
FIG. 2 is a function block diagram showing the internal configuration of parts of the receipt and claim ticket printing system 10.

FIG. 2 is a function block diagram showing the internal configuration of parts of the receipt and claim ticket printing system 10.

The receipt and claim ticket printing device 100 includes an interface unit (I/O interface) 110, control unit 120, storage unit 130, and print unit 140.

The operating terminal 200 includes an interface unit (I/O interface) 210, operating unit 220, control unit 230, unlock current supply unit 240, and open/close current supply unit 250.

The cash drawer 400 includes a lock mechanism 410, open/close drive mechanism 420, and drawer tray 430.

The interface unit 210 includes a network interface for communicating with a management server over a network connection, and a device interface for connecting a display device 300 and barcode scanner 500. The interface unit 210 exchanges data with the management server, and handles the output of display information (image data) to the display device 300 and the input of data captured, for example, by reading product barcodes with the barcode scanner 500.

The operating unit 220 has plural buttons enabling the operator to input the name, price, and number of the purchased products. The operating unit 220 in this embodiment also has a button enabling the operator to tell the receipt and claim ticket printing device 100 to print a claim ticket for the purchased products when the customer asks to temporarily check the products for later pickup; a button enabling the operator to tell the receipt and claim ticket printing device 100 to print an image of the selected product on the claim ticket when the buyer selects a product to print an image of on the claim ticket; and a button for opening the drawer tray 430 of the cash drawer 400. Note that when the operating terminal 200 can determine the names and prices of the purchased products as a result of the operator scanning barcodes printed on the products with the barcode scanner 500, the operating unit 220 does not necessarily need to have buttons for inputting product name and price information.

The control unit 230 controls other parts of the operating terminal 200 to generate image information for display on the display device 300 based on information input through the interface unit 210 from the management server, and outputs the image information through the interface unit 210 to the display device 300.

Based on data read from product barcodes by the barcode scanner 500 and input manually to the operating unit 220, the control unit 230 generates the information ("receipt information" below) to be printed on the sales receipt 1000, including product name and price information and the total purchase amount. The control unit 230 also outputs the receipt information with sales receipt 1000 print commands through the interface unit 210 to the print unit 140. Note that the control unit 230 may have a storage unit for storing the name, price, and total amount of purchased products, and information input from the management server through the interface unit 210.

When input of an operation for opening the drawer tray 430 of the cash drawer 400 is received from the operating unit 220, the control unit 230 causes the unlock current supply unit 240 to supply current for unlocking the drawer tray 430 to the lock mechanism 410 of the cash drawer 400, and causes the open/close current supply unit 250 to supply drive current for opening the drawer tray 430 to the open/close drive mechanism 420.

The cash drawer 400 is provided for holding cash, checks, change, and the like received from customers. The lock mechanism 410 of the cash drawer 400 includes, for example, a solenoid coil, plunger, hook and spring. When the above current from the unlock current supply unit 240 is supplied to the solenoid coil, the plunger moves in the unlocking direction, the engaging part of the hook disengages the drawer tray 430, and the lock is unlocked. The urging force of the spring urging the drawer tray 430 in the opening direction pushes the drawer tray 430 in the open direction. When the above drive current is supplied from the open/close current supply unit 250 to the open/close drive mechanism 420 at this time, the drawer tray 430 is opened completely by the open/close drive mechanism 420.

The receipt and claim ticket printing device 100 has an interface unit 110, control unit 120, storage unit 130, and print unit 140. The interface unit 110 handles data communication with the operating terminal 200. The storage unit 130 functions as the product image storage unit of the invention, and stores an image of every product sold in the store where the receipt and claim ticket printing system 10 is installed linked to the name of the product. In this embodiment the storage unit 130 also stores the product images linked to the price and quantity sold of each product.

The control unit 120 could also get the latest product information, such as product price and quantity sold information, from the management server (through the operating terminal 200) at specific times, and update the information stored in the storage unit 130 accordingly. The storage unit 130 could also store control programs such as a driver for controlling the print unit 140, for example.

The control unit 120 controls other parts of the receipt and claim ticket printing device 100, and when a sales receipt 1000 print command and receipt information are input from the operating terminal 200 through the interface unit 110, generates and outputs print data causing the print unit 140 to print a sales receipt 1000 to the print unit 140.

The control unit 120 functions as a product image extraction unit according to the invention, and when a print command for a sales receipt 1000 is input together with a print command for printing a claim ticket 1010 through the interface unit 110, extracts the product image for at least one product included in the products (purchased products) contained in the receipt information from among the product images stored in the storage unit 130.

When plural products are included in the receipt information, that is, when plural products are purchased, the control unit 120 in this embodiment of the invention extracts a product image with high distinguishability from the group of product images of the products contained in the receipt. More specifically, the control unit 120 gets the number of items sold for each of the plural purchased products from the storage unit 130, for example, and determines which of the plural products was purchased in the smallest quantity. The control unit 120 then extracts the image of the product purchased in the smallest quantity from the storage unit 130 as the product image to be printed on the claim ticket 1010.

When the purchased products include two or more products that were purchased in the same smallest quantity, the control unit 120 gets the sale price of each of those products from the storage unit 130 and finds the product with the highest price. The control unit 120 then extracts the image of that product from the storage unit 130 as the product image to be printed on the claim ticket 1010.

The control unit 120 then generates print data for the print unit 140 to print a claim ticket 1010 based on the names and quantities of the purchased products and the extracted product image, and outputs the print data to the print unit 140.

The print unit 140 includes, for example, a roll paper stocker in which roll paper is stocked, a carriage, a printhead, and an ink tank, and prints sales receipts 1000 based on the print data input from the control unit 120. When print data for a claim ticket 1010 is also input from the control unit 120, the print unit 140 prints a claim ticket 1010 with the sales receipt 1000.

The claim ticket 1010 printed by the print unit 140 in this embodiment of the invention has two parts, a claim ticket 1010-A for the store that will hold the purchased products, and a claim ticket 1010-B that is given to the customer and used to claim the checked goods.

Figure 5:
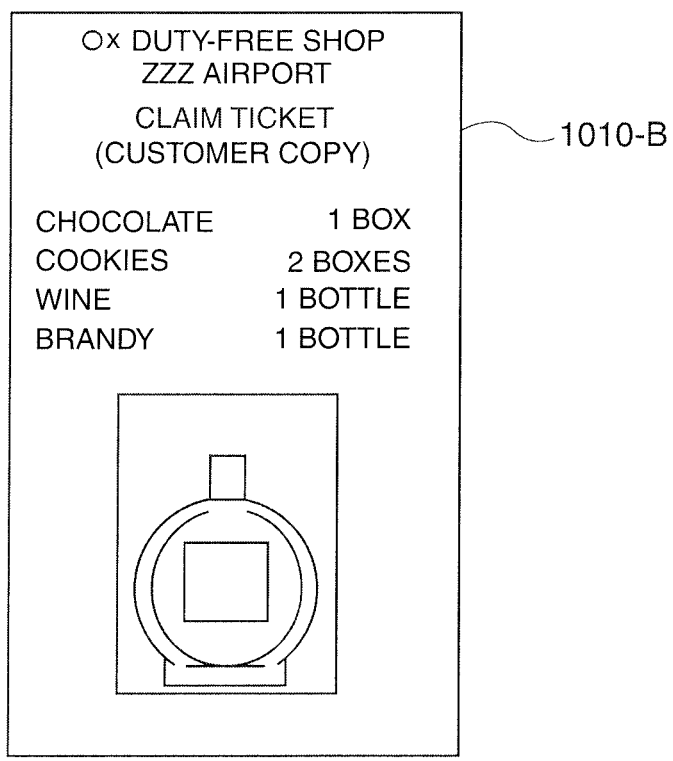
FIG. 5 shows an example of a claim ticket 1010-B for the customer.

FIG. 3 shows an example of a sales receipt 1000. FIG. 4 shows an example of a claim ticket 1010-A for the store, and FIG. 5 shows an example of a claim ticket 1010-B given to the customer (buyer). If one $15 box of chocolates, two $12 boxes of cookies, one $20 bottle of wine, and one $95 dollar of brandy, for example, are purchased, the receipt and claim ticket printing system 10 in this example drives the receipt and claim ticket printing device 100 to print a sales receipt 1000 as shown in FIG. 3, a store claim ticket 1010-A as shown in FIG. 4, and a customer claim ticket 1010-B as shown in FIG. 5.

In this example the product image of the brandy, which is one of the products with the smallest quantity sold and is the most expensive of those products, is printed at the bottom of the store claim ticket 1010-A and the customer claim ticket 1010-B. The print unit 140 in this example also prints the store claim ticket 1010-A on an adhesive label that can be affixed to the surface of the packaging of the purchased products. The print unit 140 could also print the sales receipt 1000 and the customer claim ticket 1010-B together.

Because the receipt and claim ticket printing system 10 according to this embodiment of the invention thus prints a claim ticket 1010 on which a product image of a purchased product is printed together with the sales receipt 1000 at the time of purchase, the store clerk holding the purchased goods can refer to the product image printed on the claim ticket 1010 when handing the temporarily checked products to the customer to verify that the correct goods are delivered to the right customer. Accidents such as a clerk mistakenly handing goods purchased by a different person to the wrong customer can thus be prevented.

Furthermore, because the product image of a product that is less likely to have also been purchased by a different customer, such the product with the smallest quantity sold among plural purchased products, or the product with the highest cost, is printed on the claim ticket 1010, the store clerk can more easily confirm from the claim ticket 1010 that the correct products are delivered when delivering the purchased products to the buyer.

In addition, because a claim ticket 1010-A for the store and a claim ticket 1010-B for the buyer are printed as the claim ticket 1010, picking errors can be prevented when delivering the products to the buyers by comparing the content of the customer claim ticket 1010-B presented when the buyer claims the products with the store claim ticket 1010-A kept by the store. In addition, if the buyer loses the customer claim ticket 1010-B, the store clerk can easily find the products purchased by the buyer by finding the claim ticket 1010-A matching the receipt presented by the buyer, for example.

In addition, because the store claim ticket 1010-A is printed as a label that can be affixed to the surface of the packaging of the purchased products, the store clerk can easily find the right products when delivering the products to the buyer by, for example, affixing the claim ticket 1010-A to the surface of the bag in which the products are placed. Loss of the claim ticket 1010-B by the buyer is also more unlikely if the customer claim ticket 1010-B is printed in unison with the sales receipt 1000.

Figure 6:
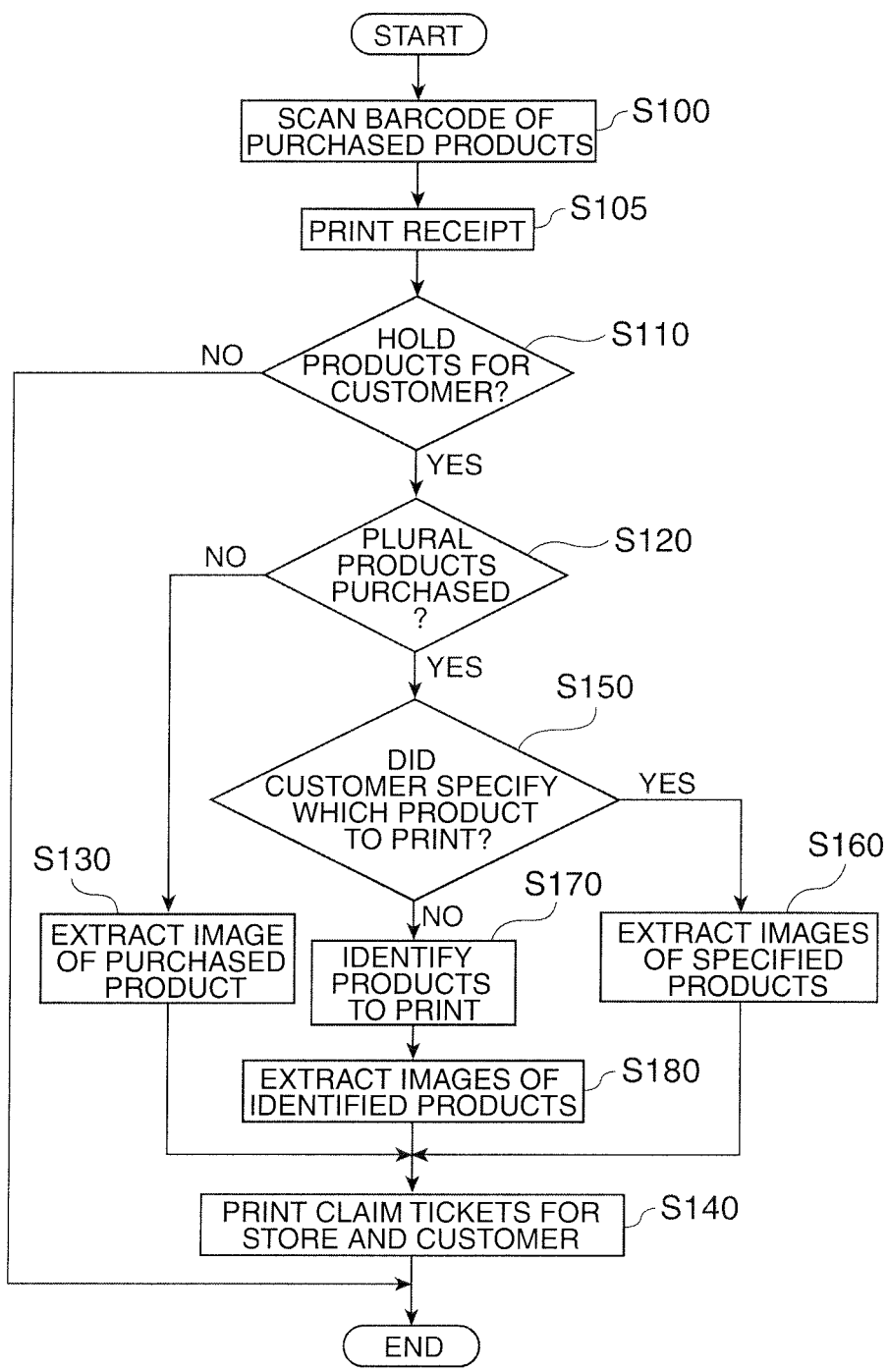
FIG. 6 is a flow chart showing the operation of the receipt and claim ticket printing system 10 for printing a sales receipt 1000 and claim tickets 1010-A and 1010-B.

FIG. 6 is a flow chart showing an example of the operation whereby the receipt and claim ticket printing system 10 issues a sales receipt 1000, a store claim ticket 1010-A, and a customer claim ticket 1010-B.

This process starts with using the barcode scanner 500 to read the barcode from each product brought to the cash register for purchase, inputting the quantity of each product purchased using the operating unit 220 of the operating terminal 200, and sending name, quantity, and price information for each purchased product to the receipt and claim ticket printing device 100 (step S100).

Payment for the purchased products is then stored in the cash drawer 400, and a receipt 1000 showing the name and price of the purchased products and the total sale amount is printed by the receipt and claim ticket printing device 100 (step S105).

If the buyer wants to temporarily check the purchased products for later pickup (step S110 returns Yes) and only one kind of product is purchased (step S120 returns No), the receipt and claim ticket printing device 100 extracts the product image of the purchased product (step S130) and issues a store claim ticket 1010-A and customer claim ticket 1010-B with the product image printed on each (step S140).

If in step S110 the buyer decides to leave with the purchased products (does not wish to temporarily check the products for later pickup) (step S110 returns No), this process ends without printing claim tickets 1010-A and 1010-B.

If in step S120 two or more different kinds of products were purchased (step S120 returns Yes) and the buyer selects the product for which to print an image on the claim tickets 1010-A and 1010-B (step S150 returns Yes), the receipt and claim ticket printing device 100 extracts the product image of the product selected by the buyer (step S160) and issues a store claim ticket 1010-A and customer claim ticket 1010-B with the product image printed on each (step S140).

If in step S150 the buyer does not select a product (step S150 returns No), the receipt and claim ticket printing device 100 selects the product with the smallest quantity sold among the group of purchased products as the product for which an image is to be printed on claim ticket 1010-A and claim ticket 1010-B. If the group of purchased products includes plural products with the same smallest quantity sold, the receipt and claim ticket printing device 100 selects the product in that group with the highest price as the product for which to print an image on the claim tickets 1010-A and 1010-B (step S170). The product image of the selected product is then extracted (step S180), and a store claim ticket 1010-A and a customer claim ticket 1010-B are issued with the product image printed on each (step S140).

A preferred embodiment of the invention is described above, but the technical scope of the invention is not limited to this embodiment. Various modifications and improvements that can be applied to the foregoing embodiment will be obvious to one with ordinary skill in the related art. For example, the receipt and claim ticket printing system 10 described above has a control unit 120 that functions as the product image extraction unit of the invention and a storage unit 130 that functions as the product image storage unit of the invention disposed to the receipt and claim ticket printing device 100, but a configuration in which the control unit 230 of the operating terminal 200 functions as the product image extraction unit of the invention and a storage unit that functions as the product image storage unit is disposed to the operating terminal 200 is also conceivable.

Furthermore, the receipt and claim ticket printing system 10 reduces the number of product images printed on the claim ticket 1010 to one based on the quantity sold and the sale price of the purchased products, but the invention is not so limited and plural product images could be printed on the claim ticket 1010. In this case the control unit 120 could, for example, select plural (such as three) products from among the purchased products in ascending order based on the quantity sold or descending order based on the sale price, and extract images of those products from the storage unit 130 as the product images to be printed on the claim ticket 1010.

Further alternatively, the control unit 120 could select the product purchased in the smallest quantity among the purchased products, extract the image of that product from the storage unit 130 as the product image to be printed on the claim ticket 1010, and print that product image the same number of times as the quantity purchased on the claim ticket 1010.

Yet further alternatively, the control unit 120 could select a product representative of each product genre in the group of purchased products, and extract the image of each selected product from the storage unit 130 as the product images to be printed on the claim ticket 1010. In this configuration, chocolate and cookies might in a confectionary genre, while wine and brandy are in an alcoholic beverages genre.

Further alternatively, the control unit 120 could rank and assign points based on an index such as the number purchased or the purchase price of the purchased products, identify the product with the highest total of points from all indexes, or plural products including that product, and extract the image of that product from the storage unit 130 as the product image to be printed on the claim ticket 1010.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. The receipt and claim ticket printing device that issues to a buyer of at least one product a receipt and a claim ticket for the at least one product, comprising:
    a product image storage unit that stores product images of the products that are sold;
    a product image extraction unit that extracts the product image of at least one product purchased by the buyer from the product image storage unit when the receipt is issued; and
    a print unit that prints at a time of purchase the receipt showing at least a name of the at least one purchased product, price of the at least one purchased product, and a total purchase amount, and that prints at the time of purchase the claim ticket on which the extracted product image is printed, wherein:
    the claim ticket is for the buyer; and
    the print unit prints a second claim ticket for a store that temporarily holds the purchased products, the extracted product image being printed on the second claim ticket.

2. The receipt and claim ticket printing device described in claim 1, wherein:
    the product image extraction unit extracts a product image with high distinguishability from among the product images of the purchased products when plural products are purchased.

3. The receipt and claim ticket printing device described in claim 2, wherein:
    the product image storage unit stores product images of the products that are sold linked to the price and quantity sold of the products; and
    the product image extraction unit selects from among the plural purchased products at least one of the products with the highest price and the product with the smallest quantity sold, and extracts the product image of the selected at least one product.

4. The receipt and claim ticket printing device described in claim 2, wherein:
    the product image extraction unit extracts the product image of the product selected by the buyer from among the plural purchased products.

5. The receipt and claim ticket printing device described in claim 1, wherein:
    the print unit prints the second claim ticket on a label that can be affixed to a surface of packaging for the purchased product.

6. The receipt and claim ticket printing device described in claim 1, wherein:
    the print unit prints the claim ticket in unison with the receipt.

7. The receipt and claim ticket printing device described in claim 2, wherein:

the extraction is based on a quantity of each of the products purchased such that the product image extraction unit extracts the product image for the purchased one or more of the products having a smallest quantity, the print unit printing the extracted product image on the claim ticket for the one or more purchased products having the smallest quantity.

8. The receipt and claim ticket printing device described in claim 7, wherein:
when two or more of the purchased products have the smallest quantity, the extraction is also based on a price of each of the products purchased such that the product image extraction unit extracts the product image for the purchased one or more of the products having the smallest quantity and a highest price, the print unit printing the extracted product on the claim ticket image for the one or more purchased products having the smallest quantity and the highest price.

9. The receipt and claim ticket printing device described in claim 8, wherein:
the print unit prints the extracted product image on the claim ticket for only the purchased product having the smallest quantity and the highest price.

10. The receipt and claim ticket printing device described in claim 8, wherein:
the print unit also prints the extracted product image on the claim ticket for each of the one or more purchased products having the smallest quantity and the next highest price.

11. The receipt and claim ticket printing device described in claim 7, wherein:
the print unit also prints the extracted product image on the claim ticket for each of the one or more purchased products having the next smallest quantity.

12. A receipt and claim ticket printing system that issues to a buyer of at least one product a receipt, and a claim ticket for the at least one product, comprising:
a computer that has a product image storage unit that stores product images of the products that are sold, and
a product image extraction unit that extracts the product image of at least one product purchased by the buyer from the product image storage unit when the receipt is issued; and
a receipt and claim ticket printing device that is connected to the computer over a communication line; and has
a print unit that prints at a time of purchase the receipt showing at least a name of the at least one purchased product, price of the at least one purchased product, and a total purchase amount, and that prints at the time of purchase the claim ticket on which the extracted product image is printed, wherein;
the claim ticket is for the buyer; and
the print unit prints a second claim ticket for a store hat temporarily holds the purchased products, the extracted product image being printed on the second claim ticket.

13. The receipt and claim ticket printing system described in claim 12, wherein:
the product image extraction unit extracts a product image with high distinguishability from among the product images of the purchased products when plural products are purchased.

14. The receipt and claim ticket printing system described in claim 13, wherein:
the product image storage unit stores product images of the products that are sold linked to the price and quantity sold of the products; and
the product image extraction unit selects from among the plural purchased products at least one of the products with the highest price and the product with the smallest quantity sold, and extracts the product image of the selected at least one product.

15. The receipt and claim ticket printing system described in claim 13, wherein:
the product image extraction unit extracts the product image of the product selected by the buyer from among the plural purchased products.

16. The receipt and claim ticket printing system described in claim 12, wherein:
the print unit prints the second claim ticket on a label that can be affixed to a surface of packaging for the purchased product.

17. The receipt and claim ticket printing system described in claim 12, wherein:
the print unit prints the claim ticket in unison with the receipt.

18. A receipt and claim ticket printing device that issues to a buyer of at least one product a receipt, and a claim ticket for the at least one product, comprising:
a product image storage unit that stores product images of the products that are sold;
a product image extraction unit that extracts the product image of at least one product purchased by the buyer from the product image storage unit when the receipt is issued; and
a print unit that prints at a time of purchase the receipt showing at least a name of the least one purchased product, price of the at least one purchased product, and a total purchase amount, and that prints at the time of purchase the claim ticket on which the extracted product image is printed, wherein:
the product image extraction unit extracts a product image with high distinguishability from among the product images of the purchased products when plural products are purchased; and
the extraction is based on a price of each of the products purchased such that the product image extraction unit extracts the product image for the purchased one or more of the products having a highest price, the print unit printing the extracted product image on the claim ticket for the one or more purchased products having the highest price.

* * * * *